United States Patent
Yamaguchi

(10) Patent No.: US 7,084,229 B2
(45) Date of Patent: Aug. 1, 2006

(54) SILICONE COMPOSITION FOR RELEASE AGENT

(75) Inventor: Koichi Yamaguchi, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 79 days.

(21) Appl. No.: 10/802,821

(22) Filed: Mar. 18, 2004

(65) Prior Publication Data

US 2004/0186225 A1    Sep. 23, 2004

(30) Foreign Application Priority Data

Mar. 20, 2003    (JP)    ............................. 2003-079127

(51) Int. Cl.
*C08G 77/24*    (2006.01)

(52) U.S. Cl. ............................ 528/42; 528/15; 528/32; 528/31; 524/366

(58) Field of Classification Search ................ 528/15, 528/32, 31, 42; 524/366

See application file for complete search history.

(56) References Cited

U.S. PATENT DOCUMENTS 4,842,902 A * 6/1989 Brown et al. ................ 427/387

FOREIGN PATENT DOCUMENTS

| JP | 4-76391 B2 | 12/1992 |
|---|---|---|
| JP | 5-7434 B2 | 1/1993 |
| JP | 7-18185 A | 1/1995 |

\* cited by examiner

*Primary Examiner*—Kuo-Liang Peng
(74) *Attorney, Agent, or Firm*—Birch, Stewart, Kolasch & Birch, LLP

(57) ABSTRACT

A silicone composition for a release agent, which comprises (A) an organopolysiloxane having at least two alkenyl groups bonded to a silicon atom and at least one fluorine-containing substituent bonded to a silicon atom, in one molecule, and having a fluorine content of from 20 to 40% by weight, (B) an organohydrogenpolysiloxane having at least three hydrogen atoms bonded to a silicon atom in one molecule, (C) a straight-chain perfluoropolyether anti-foaming agent, and (D) a platinum group metal catalyst. Even when the silicone composition is diluted with a non-fluorine-type solvent, it is possible to avoid foaming (the reason for pin holes and repelling) does not occur during roller coating. Moreover, the silicone composition provides a cured coating which needs only a low peel force and hardly gives reduction in the residual adhesive ratio.

8 Claims, No Drawings

SILICONE COMPOSITION FOR RELEASE AGENT

This Non-provisional application claims priority under 35 U.S.C. § 119(a) on Patent Application No(s). 2003-079127 filed in Japan on Mar. 20, 2003, the entire contents of which are hereby incorporated by reference.

FIELD OF THE INVENTION

This invention relates to a silicone composition for a release agent, which can be diluted with non-halogen solvents and can form a cured silicone coating having a small surface energy.

BACKGROUND OF THE INVENTION

For the purpose of preventing adhesion or bonding between a substrate (e.g., paper, a plastic film or the like) and a pressure-sensitive adhesive material, it has been a practice to impart releasing properties by way of forming a cured coating of a silicone composition on the substrate surface. Such a product is generally called "release paper".

Among the aforementioned pressure-sensitive adhesive materials, a silicone adhesive containing an organopolysiloxane as the main component is used in a broad range of applications because of its excellent properties in terms of heat resistance, cold resistance, chemical resistance, electrical insulation, low toxicity and the like. Since the adhesion of the silicone adhesive is markedly strong, an excellent releasability of the cured silicone coating formed on the aforementioned substrate is required, in order to easily release a pressure-sensitive adhesive tape or label from the aforementioned substrate.

The silicone compositions capable of providing a cured silicone coating having an excellent releasability which have been proposed include (1) a curable coating composition containing (A) an organopolysiloxane having a perfluoroalkyl group represented by the formula $C_nF_{2n+1}CH_2CH_2—$ (n is an integer of 1 or more) and an alkenyl group, (B) a hydrosilylation catalyst containing platinum, and (C) an organohydroxypolysiloxane cross-linking agent (cf. JP-B-5-7434), and (2) a curable silicone composition containing (a) an organopolysiloxane having a perfluoropolyether group represented by the formula $[CF(CF_3)CF_2O]_nCF(CF_3)CF_2OCH_2CH_2CH_2—$ (n is an integer of from 1 to 5) and an alkenyl group, (b) an organohydrogenpolysiloxane, and (c) an addition reaction catalyst (cf. JP-B-4-76391).

These organopolysiloxane compositions are applied to a substrate after diluting them with solvents. A fluorine solvent is suitably used as the solvent in view of the solubility of the fluorine-containing organopolysiloxane composition in the solvent.

Although fluorine solvents can sufficiently dilute the fluorine-containing organopolysiloxane, they are expensive and have a problem in that they exert adverse influences upon the natural environment when diffused into the air.

As a silicone composition which can be diluted with non-fluorine solvents and which is capable of providing a cured silicone coating excellent in the release ability, it has been proposed a silicone composition or a realse agent, which contains (A) an organopolysiloxane having at least two alkenyl groups bonded to a silicon atom and at least one fluorine-containing substituent bonded to a silicon atom, in one molecule, and having a fluorine content of from 20 to 40% by weight, (B) an organohydrogenpolysiloxane having at least three hydrogen atoms bonded to a silicon atom in one molecule, and (C) a platinum group metal catalyst (cf. JP-A-7-18185).

When this silicone composition for a release agent is dissolved in a non-fluorine solvent, it is homogeneously dissolved and transparent in appearance. However, the solution is easy to show foaming due to a slight difference in compatibility. Particularly, it frequently foams by revolution of a roll coater in a coating solution, so that pin holes and repelling phenomenon are generated on the coating surface, which is a reason for partially showing tight release.

References:
JP-B-5-7434
JP-B-4-76391
JP-A-7-18185

SUMMARY OF THE INVENTION

The present invention was achieved by taking the aforementioned circumstances into consideration. The present invention provides a silicone composition for a release agent. Even when the silicone composition of the present invention is diluted with a non-fluorine solvent, it does not show foaming during roller coating, which is a reason for pin holes and repelling. Moreover, the silicone composition of the present invention provides a cured coating which requires only a low peel force and hardly gives reduction in the residual adhesive ratio.

As a result of extensive studies for the purpose of achieving the above objects, the present inventors have found that a silicone composition for a release agent, which gives a cured coating requiring only a small peel force and giving a small residual adhesive ratio can be obtained by blending (A) an organopolysiloxane having at least two alkenyl groups bonded to a silicon atom and at least one fluorine-containing substituent bonded to a silicon atom, in one molecule, and having a fluorine content of from 20 to 40% by weight, (B) an organohydrogenpolysiloxane having at least three hydrogen atoms bonded to a silicon atom in one molecule, (C) a straight-chain perfluoropolyether anti-foaming agent, and (D) a platinum group metal catalyst. The present inventors also found that a releasable cured silicone coating having an excellent anti-foaming characteristics and causing no pin holes and repelling can be prepared by diluting this composition with a non-fluorine solvent and coating the resulting solution. The present inventors also found that, since this composition can be diluted with a non-fluorine solvent, a releasable cured silicone coating can be prepared at a low cost without causing air pollution and that the cured coating is excellent in water repellency, oil repellency and heat resistance. As a result, the present invention was accomplished.

Thus, the present invention provides a silicone composition for a release agent, which comprises (A) an organopolysiloxane having at least two alkenyl groups bonded to a silicon atom and at least one fluorine-containing substituent bonded to a silicon atom, in one molecule, and having a fluorine content of from 20 to 40% by weight, (B) an organohydrogenpolysiloxane having at least three hydrogen atoms bonded to a silicon atom in one molecule, (C) a straight-chain perfluoropolyether anti-foaming agent, and (D) a platinum group metal catalyst.

DETAILED DESCRIPTION OF THE INVENTION

Hereinafter, the present invention is further described in detail. The component (A) is an organopolysiloxane which has at least two alkenyl groups bonded to a silicon atom and at least one fluorine-containing substituent bonded to a silicon atom, in one molecule, and has a fluorine content of from 20 to 40% by weight.

If the fluorine content exceeds 40% by weight, the organopolysiloxane may become insoluble in a non-fluorine solvent. If the fluorine content is less than 20% by weight, releasability of the cured coating from silicone adhesives may become poor.

As the organopolysiloxane of component (A), those represented by the following formula may suitably be used.

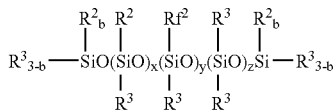

In the formula above, $R^2$ is an alkenyl group having from 2 to 10 carbon atoms. Illustrative examples thereof include a vinyl group, an allyl group, a hexenyl group and the like.

$R^3$ is an unsubstituted or substituted monovalent hydrocarbon group having from 1 to 10 carbon atoms, excluding unsaturated aliphatic groups. Illustrative examples thereof include alkyl groups (e.g., a methyl group, an ethyl group, a propyl group, a butyl group and the like), cycloalkyl groups (e.g., a cyclohexyl group and the like), aryl groups (e.g., a phenyl group, a tolyl group and the like), as well as the groups in which a part or all of the hydrogen atoms of these groups are substituted with a hydroxy group, a cyano group and the like (e.g., a hydroxypropyl group, a cyanoethyl group and the like). The symbol b is 1, 2 or 3, and x, y and z are respectively integers of $0 \leq x \leq 5$, $1 \leq y \leq 1000$ and $2 \leq z \leq 2000$, preferably integers of $0 \leq x \leq 2$, $10 \leq y \leq 500$ and $20 \leq z \leq 1000$.

$Rf^2$ is at least one member selected from the groups represented by the following formulae (1) to (6).

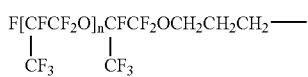 (1)

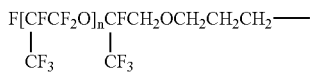 (2)

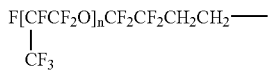 (3)

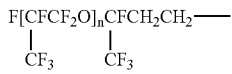 (4)

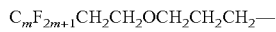 (5)

 (6)

(In the formulae above, n is an integer of from 1 to 5, and m is an integer of from 3 to 10. The plural number of "n" may be the same or different from each other and the plural number of "m" may be the same or different from each other.)

The organopolysiloxane of the component (A) may be either a straight chain or branched chain. Illustrative examples thereof include those represented by the following formulae.

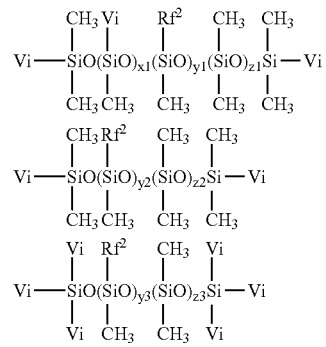

(In the formulae above, $Rf^2$ is as defined above, Vi represents a vinyl group, and x, y1, y2, y3, z1, z2, z3 are respectively integers of $0 \leq x1 \leq 5$, $1 \leq y1 \leq 1000$, $1 \leq y2 \leq 200$, $1 \leq y3 \leq 1000$, $2 \leq z1 \leq 2000$, $2 \leq z2 \leq 500$, and $2 \leq z3 \leq 2000$.

The organohydrogenpolysiloxane of the component (B) has at least three hydrogen atoms bonded to a silicon atom in one molecule. A cured coating is formed by the addition reaction between this SiH group with the alkenyl group in the component (A).

From the viewpoint of compatibility with the organopolysiloxane of component (A), it is preferable that this organohydrogenpolysiloxane has a fluorine content of 0 to 40% by weight or less. Also, this organopolysiloxane may have any of straight, branched and cyclic structures.

Illustrative examples of the organohydrogenpolysiloxane of the component (B) include those represented by the following formula.

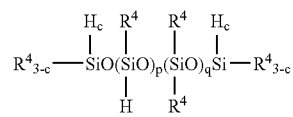

In the formula above, $R^4$ is at least one group selected from the same groups with $R^3$ and $Rf^2$, c is 0 or 1, p and q are respectively integers of $1 \leq p \leq 200$ and $0 \leq q \leq 100$, provided that $3 \leq p+2c$.

Illustrative examples of the organohydrogenpolysiloxane of the component (B) include those represented by the following formulae.

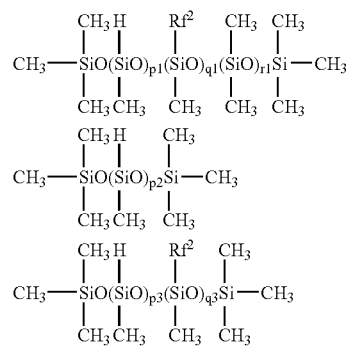

-continued

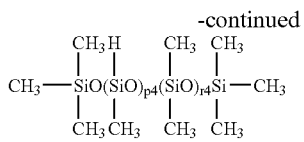

(In the formulae above, Me is as defined above, and p1, p2, p3, p4, q1, q3, r1 and r4 are respectively integers of 1≦p1≦100, 1≦p2≦100, 1≦p3≦100, 1≦p4≦100, 1≦q1≦50, 1≦q3≦50, 1≦r1≦50, and 1≦r4≦50)

The organopolysiloxane of the component (B) is blended preferably in an amount of from 0.1 to 20 parts ("parts" means "parts by weight", the same shall apply hereinafter), particularly from 0.2 to 10 parts, based on 100 parts of the component (A). When the blending amount is less than 0.1 part or exceeds 20 parts, both of the cases may sometimes cause deterioration in the curing characteristics of the silicone composition or in physical properties of the cured product.

The straight-chain perfluoropolyether anti-foaming agent of the component (C) is used for preventing foaming which occurs when the composition is homogeneously dissolved in a non-fluorine solvent and subjected to roller coating.

The straight-chain perfluoropolyether anti-foaming agent of the component (C) is preferably a compound represented by the following formula (7).

$$Rf^1(COOR^1)_a \quad (7)$$

(In the formula above, $Rf^1$ is a perfluoropolyether group, $R^1$ is a lower alkyl group, and a is 1 or 2.)

In the formula above, $Rf^1$ is a monovalent or divalent straight-chain perfluoropolyether group, and perfluoropolyether groups of various chain lengths are included. Preferably, $Rf^1$ is a monovalent or divalent straight-chain perfluoropolyether having, as a repeating unit, a perfluoropolyether group having approximately from 1 to 4 carbon atoms.

The following are illustrative examples of the monovalent straight-chain perfluoropolyether.

F—(CF$_2$CF$_2$CF$_2$O)$_k$CF$_2$CF$_2$—

—(OC$_2$F$_4$)$_s$—(OCF$_2$)$_t$—F

CF$_3$O—(CF$_2$CF$_2$O)$_l$CF$_2$—

Also, the following are illustrative examples of the divalent straight-chain perfluoropolyether.

—CF$_2$CF$_2$O(CF$_2$CF$_2$CF$_2$O)$_k$CF$_2$CF$_2$—

—CF$_2$(OC$_2$F$_4$)$_{s'}$—(OCF$_2$)$_{t'}$—

In this case, each of k, l, s, t, k', s', t' in the above chemical structural formulae is an integer of 1 or more. Illustratively, k, l, s, t, k', s' and t' are preferably integers within the ranges of 1≦k≦30, 1≦l≦40, 1≦s≦30, 1≦t≦30, 1≦k'≦30, 1≦s'≦30, 1≦t'≦30, respectively. In this regard, the molecular structure of perfluoropolyether is not limited to those exemplified above.

$R^1$ is a lower alkyl group having from 1 to 5 carbon atoms. Illustrative examples thereof include a methyl group, an ethyl group, a propyl group and the like, and a methyl group is particularly preferable.

The molecular weight of the straight-chain perfluoropolyether anti-foaming agent is not particularly limited. By taking the solubility in non-fluorine solvents, the defoaming performance and the like into consideration, the suitably molecular weight is from 100 to 10,000, preferably from 500 to 5,000, as a number average molecular weight.

The straight-chain perfluoropolyether anti-foaming agent of the component (C) is added preferably in an amount within the range of from 1 to 5,000 ppm, preferably from 50 to 1,000 ppm, based on the component (A). The intended defoaming effect may not be obtained when the amount is less than 1 ppm. The properties of the cured product may be deteriorated in some cases when the amount exceeds 5,000 ppm.

The platinum group metal catalyst of the component (D) is a catalyst for accelerating the addition reaction of the component (A) with the component (B). Any compound commonly known as a catalyst for the reaction can be used. Examples of such a platinum group metal catalyst include platinum catalyst, palladium catalyst, rhodium catalyst and the like, of which a platinum catalyst is particularly preferable. Examples of such a platinum catalyst include chloroplatinic acid, an alcohol solution of chloroplatinic acid, and a complex of chloroplatinic acid with various types of olefin or vinylsiloxanes.

The amount of these platinum group metal catalysts may be a catalytically effective amount. In view of the reactivity for obtaining a cured coating and the economical aspect, it is preferable to set the amount of the catalyst within a range of from 1 to 1,000 ppm as the amount of platinum group metal based on the component (A).

The composition of the present invention is obtained by blending predetermined amounts of the aforementioned components (A) to (D). Optional components other than the above components, such as activity-controlling agents (e.g., various organic nitrogen compounds, organic phosphorus compounds, organic silicon compounds, acetylene compounds, oxime compounds and the like) may be added for the purpose of controlling the catalytic activity of the platinum group metal catalyst. Among these activity-controlling agents, acetylene compounds (e.g., 3-methyl-1-butyn-3-ol and the like) and silylation products thereof, and silicon compounds (e.g., divinyl tetramethyldisiloxane, tetravinyltetramethylcyclotetrasiloxane and the like) are suitably used.

The activity controlling agent is blended preferably in an amount of from 0.05 to 3 parts based on 100 parts of the component (A). The silicone composition may sometimes cause gelation when the amount is less than 0.05 part. Curing of the silicone composition may be inhibited in some cases when the amount exceeds 3 parts. In addition, the other optional components may be added generally in the amounts within such a range that they do not spoil the effects of the present invention.

For the preparation of the silicone composition of the invention, it is preferable that the component (A), the component (B) and the component (C) are homogeneously mixed in advance and then the component (D) is added. The respective components may be used alone or as a mixture of two or more.

For applying the silicone composition prepared in this manner to a substrate, the silicone composition is dissolved in a solvent in order to make its application easy by the homogeneous dilution. The silicone composition of the present invention can be dissolved in non-halogen solvents. The non-halogen solvent means that a halogen atom is not substantially contained in the molecule of the solvent. Illustrative examples of the non-halogen solvent include aliphatic hydrocarbon solvents (e.g., hexane, heptane, octane, isooctane, petroleum benzin, ligroin, industrial gasoline, naphtha solvent and the like), aromatic hydrocarbon solvents (e.g., toluene, xylene and the like), ether solvents (e.g., diethyl ether, diisopropyl ether, dibutyl ether, dioxane and the like), ketone solvents (e.g., acetone, methyl ethyl ketone, methyl isobutyl ketone, cyclohexanone and the like), and ester solvents (e.g., methyl acetate, ethyl acetate, isopropyl acetate, butyl acetate, methyl propionate and the like). Ether, ketone and ester solvents are preferable. The solvent can be used alone or as a mixture of two or more.

When the silicone composition of the present invention is used as a release agent, the silicone composition is applied preferably to a polyester film from the viewpoint of heat resistance. In such a case, it is preferable to use an aliphatic hydrocarbon solvent as the non-halogen solvent in view of its wettability to the polyester film substrate.

The non-halogen solvent is used preferably in such an amount that the viscosity of the silicone composition after dilution becomes 100 cp or less, in view of the workability and easy control of the amount to be applied during application of the silicone composition dissolved with this solvent. It is preferable to use it in an amount of from 100 to 20,000 parts based on 100 parts of the component (A).

A product prepared by applying the silicone composition of the present invention to a substrate and curing it to form a releasable cured coating on the substrate surface may be used as a release paper. Examples of the substrate include plastic films and sheets obtained from synthetic resins (e.g., polyester, polypropylene, polyethylene, poly(vinyl chloride), polytetrafluoroethylene, polyimide and the like), paper materials (e.g., glassine paper, kraft paper, clay coat paper and the like), laminate paper materials (e.g., polyethylene laminated paper, polyethylene laminate kraft paper and the like), and metal foils (e.g., aluminum foil and the like).

The silicone composition may be applied to these substrates by utilizing conventionally known methods such as roller coating, gravure coating, wire doctor coating, air knife coating, dipping coating and the like.

A cured coating of the silicone composition of the present invention on a substrate may be formed, for example, as described below. A releasable cured silicone coating can be formed on the substrate surface by curing of the silicone composition through the heating of a silicone composition-applied substrate at a temperature of from 80 to 250° C. for a period of from 2 to 60 seconds, or through the irradiation of ultraviolet rays for 0.2 second or more from an ultraviolet ray irradiator (e.g., a high pressure mercury lamp or the like) after evaporation of the aforementioned non-halogen solvent.

Since the silicone composition of the present invention can give a cured coating having excellent releasability with no pin holes and repelling, it is suitable for the application to a release paper which is used for a pressure-sensitive adhesive tape or label. The silicone composition of the present invention can also be suitably used in applications such as a mold releasing agent for dies used in molding rubber, plastics and the like, an agent for treating fibers such as of paper, fabric and the like, as well as a water repelling agent, an oil repelling agent and a heat resistant coating for food packaging and the like.

The present invention is illustratively described below with reference to Test Examples, Examples and Comparative Examples, but the present invention is not limited to the following Examples.

Unless otherwise indicated, the ratios, percentages, parts, and the like used in this specification are by weight.

EXAMPLE

An organohydrogenpolysiloxane represented by the following formula II was mixed with an organopolysiloxane represented by the following formula I containing an alkenyl substituent and a fluorine-containing substituent, (the fluorine content: 38.4%), to an Si—H group/Si—CH=CH$_2$ group molar ratio of 2.5. Then, 15 parts of the mixture was diluted with 85 parts of a non-halogen mixed solvent (mixed at isopropyl ether/methyl isobutyl ketone=70/30% by weight. Then, 0.1 part of 3-methyl-1-butin-3-ol was added, followed by the addition of a complex salt of chloroplatinic acid with vinyl siloxane in an amount of 30 ppm as a platinum quantity.

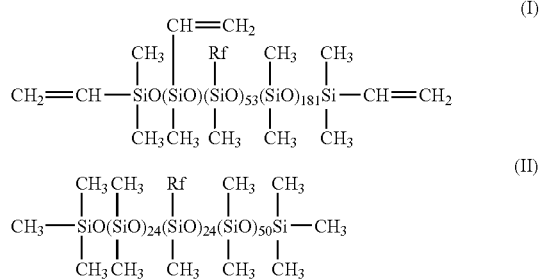

In the formulae I and II, Rf represents the following group.

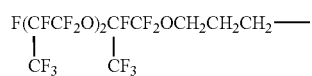

Next, a straight-chain perfluoropolyether having methyl ester on both termini and having a number average molecular weight of 2,000 (FOMBLIN Z DEAL: manufactured by Solvay Solexis) in an amount of 0.01 part, 0.05 part or 0.1 part was added based on 100 parts of the organopolysiloxane containing an alkenyl substituent and a fluorine-containing substituent. The resulting mixtures were used as samples 1 to 3.

Defoaming characteristics, the presence or absence of pin holes and repelling phenomenon, peel force and residual adhesive ratio of the silicone composition solutions obtained in this manner were measured by the methods described below. These results are shown in Table 1.

Comparative Example 1

A silicone composition solution (sample 4) was prepared in the same manner as in Example, except that the straight-chain perfluoropolyether having methyl ester on both termini and having a number average molecular weight of 2,000 of Example was not added. Defoaming characteristics, the presence or absence of pin holes and repelling phenomenon, peel force and residual adhesive ratio of the resulting silicone composition solution were measured by the methods described below. These results are shown in Table 1.

Comparative Example 2

A silicone composition solution (sample 5) was prepared in the same manner as in Example, except that 0.05 part of a branched-chain perfluoropolyether having a number average molecular weight of 1,500 (FOMBLIN Y-04: manufactured by Solvay Solexis) was added instead of the straight-chain perfluoropolyether having methyl ester on both termini and having a number average molecular weight of 2,000 of Example. Defoaming characteristics, the presence or absence of pin holes and repelling phenomenon, peel force and residual adhesive ratio of the resulting silicone composition solution were measured by the methods described below. The results are shown in Table 1.

(a) Defoaming Characteristics

A 50 g portion of each of the samples (15% in concentration) prepared in the aforementioned examples was put into a 100 ml capacity glass bottle with a transparent lid and shaken for 5 minutes on a shaker to measure the period of time until the foam completely disappeared.

(b) The Presence or Absence of Pin Holes and Repelling Phenomenon

Each of the samples prepared in the aforementioned examples (15% in concentration) was diluted 3 times with a non-halogen mixed solvent (mixed at isopropyl ether/methyl isobutyl ketone=70/30% by weight), and a 50 g portion of the resulting sample (5% in concentration) was put into a 100 ml capacity glass bottle with a transparent lid and shaken for 5 minutes on a shaker. Then it was immediately subjected to coating on a PET film having a thickness of 38 pm to a coating amount of 0.5 g/m² using a wire doctor No. 7. After the coating, this was treated at 150° C. for 60 seconds to prepare a release film. Thereafter, the presence or absence of pin holes and repelling phenomenon on the cured surface was observed with the naked eye.

(c) Peel Force

A silicone pressure-sensitive adhesive tape of 19 mm in width (NITOFULON No. 903UL, manufactured by Nitto Denko Corporation) was put on the release film obtained in (b) and stuck at 25° C. or 70° C. for 20 hours under a load of 25 g/cm² to effect aging. Using a tensile testing machine, the laminated tape was peeled at an angle of 180 degree and at a peeling rate of 0.3 m/minute to measure the force required for peeling (N/19 mm).

(d) Residual Adhesive Ratio

A pressure-sensitive adhesive tape similar to the case of the peeling measurement was put on the release film obtained in (b) and stuck at 70° C. for 20 hours under a load of 25 g/cm² to effect aging. After the aging, the pressure-sensitive adhesive tape was peeled and stuck on an SUS plate. Using a tensile testing machine, this pressure-sensitive adhesive tape was peeled at an angle of 180 degree and at a peeling rate of 0.3 m/minute to measure the force required for peeling (N/19 mm). On the other hand, the force required for peeling the same pressure-sensitive adhesive tape, but not stuck on the release film, from the SUS plate (N/19 mm) was measured and their ratio was calculated and expressed by percentage.

TABLE 1

| Samples | | De-foaming property (sec) | Presence of pin hole and repelling | Peel force (N/19 mm) 25° C. | Peel force (N/19 mm) 70° C. | Residual adhesive ratio (%) |
|---|---|---|---|---|---|---|
| Example | Sample 1 | 10 | no | 0.03 | 0.08 | 98 |
| | Sample 2 | 5 | no | 0.04 | 0.08 | 98 |
| | Sample 3 | 5 | no | 0.03 | 0.09 | 96 |
| Comparative Example 1 | Sample 4 | >300 | yes | 0.17 | 0.52 | 98 |
| Comparative Example 2 | Sample 5 | 17 | some | 0.03 | 0.14 | 96 |

While the invention has been described in detail and with reference to specific embodiments thereof, it will be apparent to one skilled in the art that various changes and modifications can be made therein without departing from the scope thereof.

This application is based on Japanese patent application No. 2003-079127 filed Mar. 20, 2003, the entire contents thereof being hereby incorporated by reference.

What is claimed is:

1. A silicone composition comprising:
   (A) an organopolysiloxane having at least two alkenyl groups bonded to a silicon atom and at least one fluorine-containing substituent bonded to a silicon atom, in one molecule, and having a fluorine content of from 20 to 40% by weight,
   (B) an organohydrogenpolysiloxane having at least three hydrogen atoms bonded to a silicon atom in one molecule,
   (C) a straight-chain perfluoropolyether anti-foaming agent, and
   (D) a platinum group metal catalyst.

2. The silicone composition according to claim 1, wherein the fluorine-containing substituent of the component (A) is at least one member selected from the groups represented by the formulae (1) to (6):

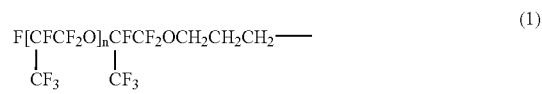

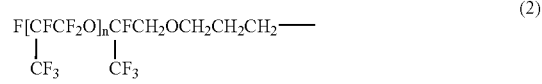

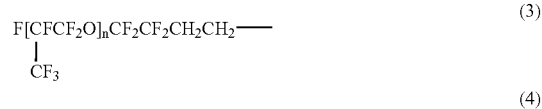

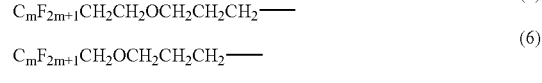

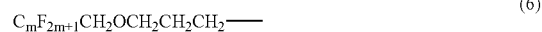

wherein n is an integer of from 1 to 5, and m is an integer of from 3 to 10.

3. The silicone composition according to claim 1, wherein the straight-chain perfluoropolyether anti-foaming agent of the component (C) is represented by the formula (7):

wherein $Rf^1$ is a perfluoropolyether group, $R^1$ is a lower alkyl group having 1 to 5 carbon atoms, and a is 1 or 2.

4. The silicone composition according to claim 3, wherein $Rf^1$ in the formula (7) is a monovalent or divalent straight-chain perfluoropolyether having, as a repeating unit, a perfluoropolyether group having from 1 to 4 carbon atoms.

5. A silicone release agent composition which comprises a silicone composition of anyone of claims 1 to 4 and a non-halogen solvent.

6. The silicone release agent composition according to claim 5, wherein the amount of the component (B) is from 0.1 to 20 parts by weight based on 100 parts by weight of the component (A); the amount of the component (C) is from 1 to 5000 ppm based on the component (A); the amount of the component (D) as the amount of platinum group metal is from 1 to 1,000 ppm based on the component (A); and the amount of the non-halogen solvent is from 100 to 20,000 parts by weight based on 100 parts by weight of the component (A).

7. The silicone composition according to claim 3, wherein $R^1$ is a methyl, ethyl or propyl group.

8. The silicone composition according to claim 3, wherein $R^1$ is a methyl group.

* * * * *